C. F. NYE & R. D. HAYWARD.
M. O. NYE, EXECUTRIX OF C. F. NYE, DEC'D.
MEANS FOR OPERATING EXTENSION STEPS AND TRAP DOORS ON RAILWAY CARS.
APPLICATION FILED NOV. 29, 1909.
999,246.
Patented Aug. 1, 1911.
2 SHEETS—SHEET 1.
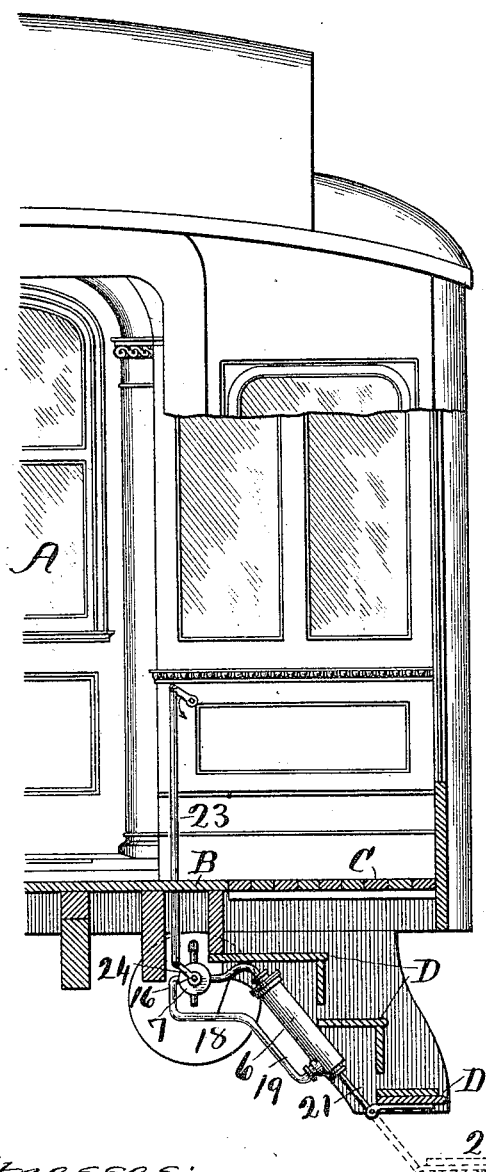
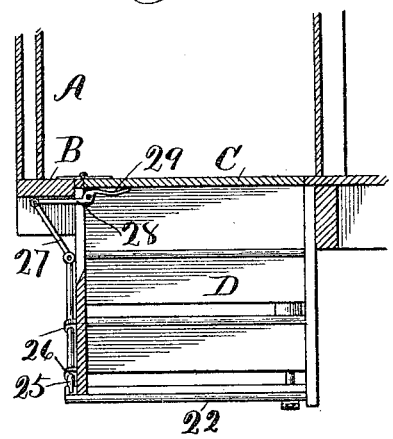
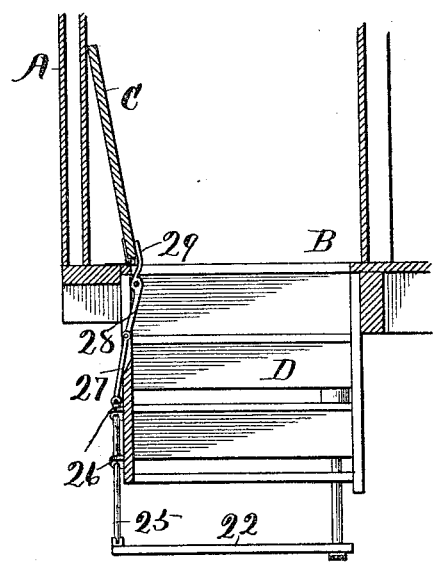

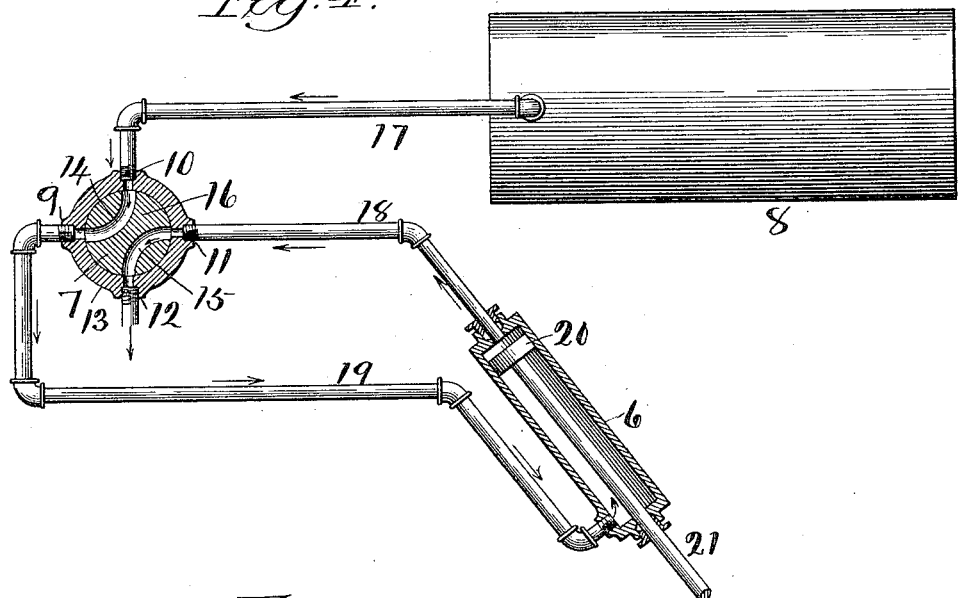
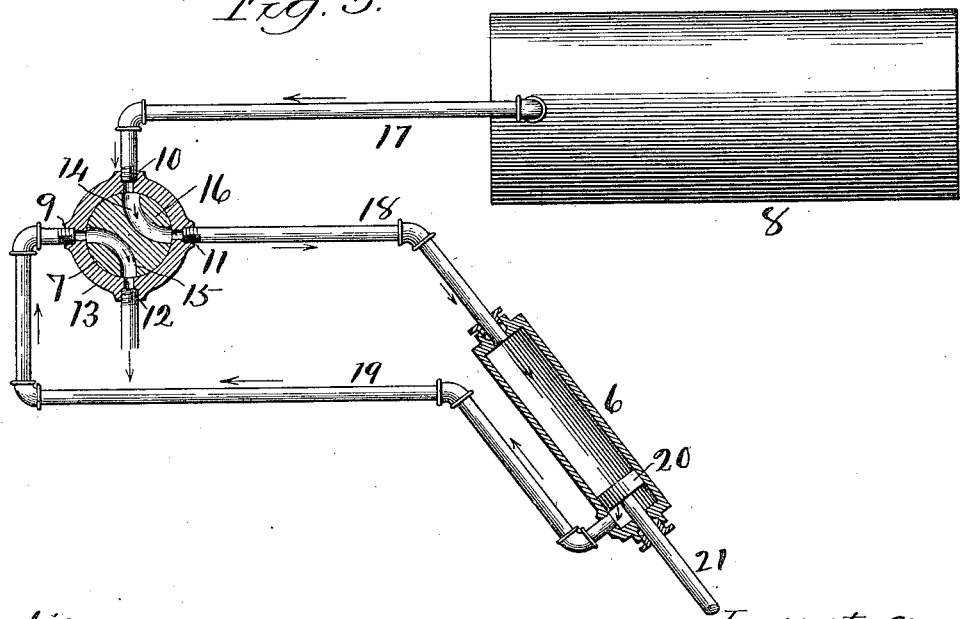

UNITED STATES PATENT OFFICE.

CHARLES F. NYE AND RICHARD D. HAYWARD, OF WARSAW, INDIANA; MINNIE O. NYE, OF WARSAW, INDIANA, EXECUTRIX OF SAID CHARLES F. NYE, DECEASED.

MEANS FOR OPERATING EXTENSION-STEPS AND TRAP-DOORS ON RAILWAY-CARS.

999,246.  Specification of Letters Patent.  Patented Aug. 1, 1911.

Application filed November 29, 1909. Serial No. 530,488.

*To all whom it may concern:*

Be it known that we, CHARLES F. NYE and RICHARD D. HAYWARD, citizens of the United States, residing at Warsaw, in the county of Kosciusko and State of Indiana, have invented certain new and useful Improvements in Means for Operating Extension-Steps and Trap-Doors on Railway-Cars, of which the following is a specification.

This invention relates to an extension step and platform trap-door for railway cars; and has for its object to provide a means and mechanism for jointly and simultaneously operating the same, as will be hereinafter set forth in detail.

Under the ordinary arrangement, an extension or auxiliary step and the trap door in the platform of a car are operated by hand.

The present invention comtemplates the use of air-pressure from the air-brake storage tanks for doing the work automatically.

Figure 1 is a view looking toward the end of a car, the steps and trap-door being shown in section. Fig. 2 is a front view showing the trap-door closed and the auxiliary step in its highest position. Fig. 3 is a similar view showing the trap-door open and the auxiliary step in its lowermost position. Fig. 4 is an elevation of the operating mechanism in one position. Fig. 5 is a similar view showing the movable ports in their opposite position.

A may represent a railway car; B, the platform; C, the trap-door therein, and D, the usual stationary steps.

An operating cylinder 6 is located out of the way under the steps. A four way valve 7 is conveniently located between the cylinder 6 and the air-supply reservoir 8 of the air-brake system. There are four openings 9, 10, 11 and 12, in the valve casing 13 and two curved ports 14 and 15 in valve-plug 16, as shown in Figs. 4 and 5. An air conducting pipe 17 connects the operating valve 7 and the air-supply reservoir 8. A pipe 18 forms a connection between the valve 7 and the upper end of the cylinder 6 and a pipe 19 the connection between the valve and the lower end of the cylinder. These pipe connections alternately become pressure and exhaust pipes in operating the piston 20 having a reciprocating movement in cylinder 6. The outer end of the piston-rod 21 connects with the lower movable extension step 22, as shown in Figs. 1, 2 and 3.

As shown in Fig. 2, the movable extension step is drawn up against the under side of the lowest of the series of stationary steps D, and the trap-door C closed down covering the steps and forming a part of the platform. This position corresponds to the position of the operating mechanism in Fig. 4. In this position the piston 20 is shown at the end of its traveled stroke in the upper end of the cylinder; the valve being turned to bring the curved port 14 to open the air-passage between the supply pipe 17 and the pipe 19 which opens into the lower end of the cylinder. The pipe 18 now being the exhaust side, the curved port 15 opening out through the exhaust opening 12. Fig. 3 shows the extension step in its opposite or lowermost position ready for use and the trap-door open. This position of the step is also indicated by dotted lines in Fig. 1. This position corresponds to the position of the operating mechanism in Fig. 5. The valve being turned to bring the curved port 14 to register between the supply pipe 17 and the pressure pipe 18 through which air is forced into the upper end of the cylinder and exhausting through the pipe 19 and the curved port 15.

A manually manipulating valve-rod 23 extends up through the platform to a convenient position; the lower end being connected to a link 24 which in turn connects with the valve-plug 16. By this means the valve-plug is turned in either direction as may be required.

The lower end of a rod 25 is secured to the extension step 22 and runs through retaining guides 26. The upper end of this rod is pivoted to the lower end of a link 27, the upper end of which is in turn pivoted to the joining end of a lever 28, the opposite end 29, being secured to the underside of the trap-door. Figs. 2 and 3 show the two positions of the connections corresponding to the open and closed positions of the trap-door. By this arrangement the extension step and trap-door are simultaneously operated by a proper manipulation of the valve controlling the air supply.

Having thus described our invention, what we claim is:—

1. In a street- or railway-car, or the like, having an entry and exit: a trap-door controlling passage through said entry and exit, a movable step beneath said trap-door, means for raising and lowering said step, and means, controlled by the movement of said step for opening and closing said trapdoor.

2. In a street- or railway-car, or the like, having an entry and exit: a trap-door controlling passage through said entry and exit, a movable step beneath said trap-door, means for automatically raising and lowering said step, and means, controlled by the movement of said step, for opening and closing said trapdoor.

3. In a street- or railway-car, or the like, having an entry and exit: a trap-door controlling passage through said entry and exit, a movable step beneath said trap-door, means, operated by liquid under pressure, for raising and lowering said step, and means, controlled by the movement of said step, for opening and closing said trap-door.

4. In a street- or railway-car, or the like, having an entry and exit: a trap-door controlling passage through said entry and exit, a movable step beneath said trap-door, means for raising and lowering said step, including a piston-cylinder, a piston reciprocable therein, and intermediate connections operatively associated with said step and with said piston, and means, controlled by the movement of said step, for opening and closing said trap-door.

5. In a street- or railway-car, or the like, having an entry and exit: a trap-door controlling passage through said entry and exit, a movable step beneath said trap-door, means for raising and lowering said step, and means, controlled by the movement of said step, for opening and closing said trap-door, including a lever bearing against said trapdoor.

6. In a street- or railway-car, or the like, having an entry and exit: a trap-door controlling passage through said entry and exit, a movable step beneath said trap-door, means for raising and lowering said step, and means, controlled by the movement of said step, for opening and closing said trap-door, comprising a lever bearing against said trap-door, a link pivoted to said lever, and a connection between and pivoted to said link and said step.

7. In a device of the character described, an extension-step, a trap-door in the car platform, the operative connection between said step and door, and means for automatically lowering and raising said step and simultaneously opening and closing said door.

8. In a device of the character described, an extension step, a trap-door having an operative connection therewith, a pressure cylinder having a reciprocating piston and rod, said rod connecting with said step, an air-reservoir, and supply and exhaust valve and the connections between said cylinder, reservoir and valve.

In testimony whereof we affix our signatures in presence of two witnesses.

CHARLES F. NYE.
RICHARD D. HAYWARD.

Witnesses:
  MABEL KIRKLAND,
  G. E. CHURCH.

---

Copies of this patent may be obtained for five cents each, by addressing the "Commissioner of Patents, Washington, D. C."